United States Patent Office 3,185,988
Patented May 25, 1965

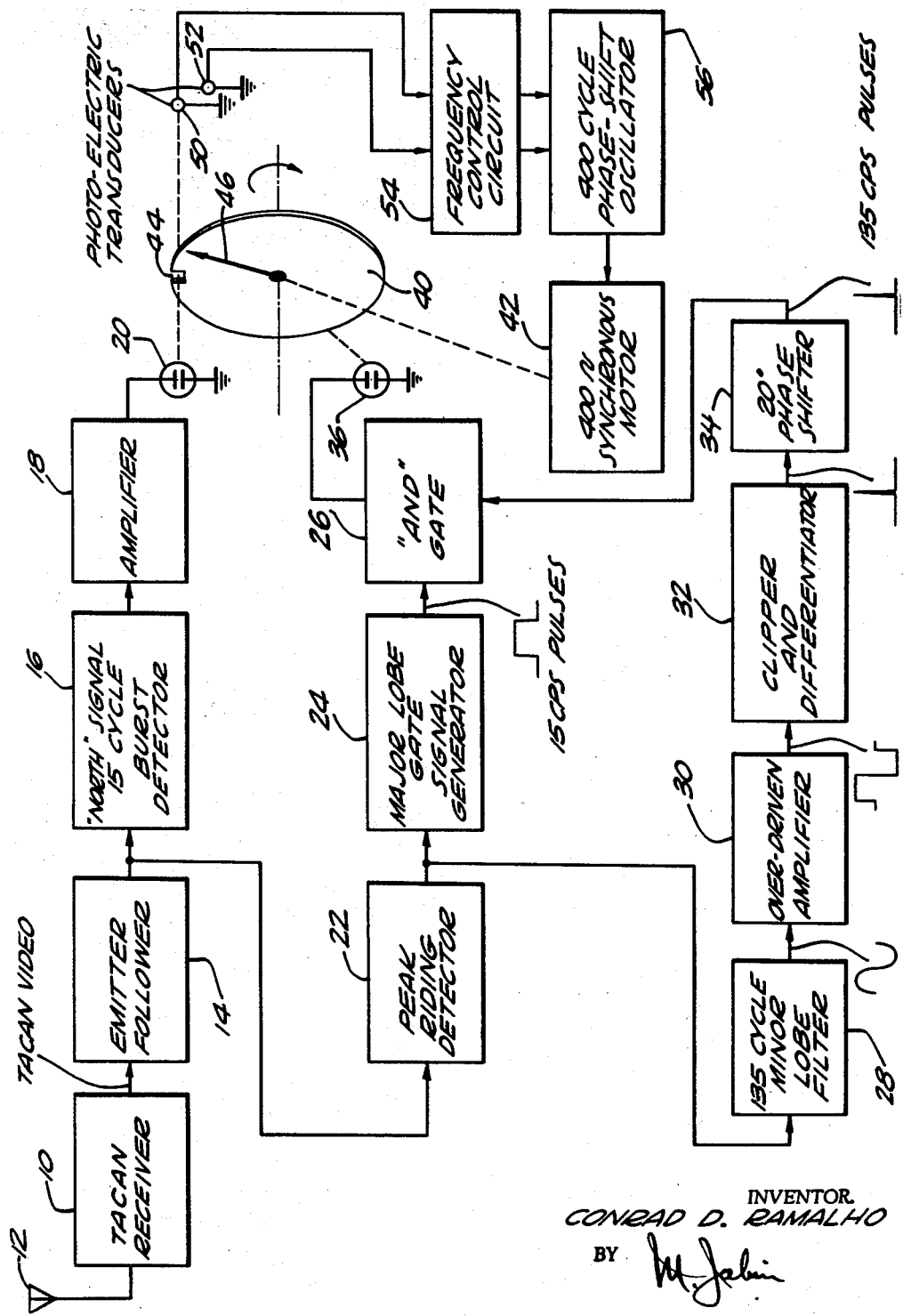

3,185,988
NAVIGATION BEARING INDICATOR SYSTEM
Conrad D. Ramalho, Manhattan Beach, Calif., assignor to Hoffman Electronics Corporation, a corporation of California
Filed Dec. 17, 1962, Ser. No. 245,093
6 Claims. (Cl. 343—106)

The present invention relates to an improved electronic navigation system, and it relates more particularly to an improved navigation system which is adapted to be mounted in a vehicle, such as an aircraft.

The electronic navigation system of the invention responds to signals received from an electronic beacon, or ground station, such as a TACAN beacon, to provide an instantaneous indication of the bearing of the aircraft with respect to the beacon and/or the actual azimuth of the aircraft.

The usual TACAN beacon produces a pulse signal which is radiated from an antenna array in a multi-lobed directional antenna pattern. The antenna pattern is rotated at 15 c.p.s. in accordance with present-day standards. The antenna pattern has a major lobe, and when the major lobe points to north, for example, the beacon transmits a non-directional signal in the form of a short burst of pulses. This latter signal is usually referred to as the "north" signal. The antenna pattern also has nine minor lobes which are equi-angularly spaced at 40° from one another.

The TACAN receiver in a vehicle, such as an aircraft, receives the signal from the TACAN beacon, the signal being in the form of a first component comprising an amplitude-modulated pulse signal, the amplitude-modulation envelope of the pulse signal being from the aforementioned rotation of the antenna pattern. The phase relationship between the amplitude-modulation envelope and the "north" signal bursts (which are received as a further component of the TACAN signal) is an indication of the azimuth of the aircraft.

The rotation of the TACAN antenna pattern produces a modulation envelope of 135 c.p.s. at the 15 c.p.s. rotation rate, this being because of the nine minor lobes. This modulation envelope is in addition to a 15 c.p.s. fundamental modulation envelope because of the major lobe. The TACAN beacon also transmits a burst of auxiliary signal pulses each time a minor lobe passes a reference point, such as north. The auxiliary pulse signal bursts are also received by the TACAN receiver in the vehicle as a component of the TACAN signal.

The usual prior art TACAN receiver is of the searching and tracking type. As an initial condition, the prior art receiver undergoes a search phase in which the 15 c.p.s. modulation envelope of the received TACAN signal is phase shifted by continuously increasing amounts until coincidence with the north reference pulse signal is achieved. At that time, the prior art TACAN receiver is automatically switched to a tracking phase, and the tracking is controlled for a fine indication by comparing the phase of the 135 c.p.s. modulation envelope and the received auxiliary reference pulse signal.

The prior art TACAN receiver of the search and track type referred to in the preceding paragraph is relatively complicated in its construction, and it is difficult to adjust and operate.

An important object of the present invention is to provide a simplified TACAN receiving system which is extremely easy to operate, and which utilizes a simplified strobing principle rather than the above-mentioned search and track principle.

Another object of the invention is to provide such an improved TACAN receiving system which is extremely accurate and reliable as compared with the prior art more-complicated TACAN receivers.

A still further object is to provide such an improved TACAN receiving system which is capable of exhibiting an unlimited tracking rate and which is incapable of false lockings with the TACAN signal.

Yet another object of the invention is to provide such an improved TACAN receiving system which is capable of providing instantaneous indications of the bearing and/or azimuth of the vehicle in which it is installed.

The embodiment of the invention to be described incorporates an indicating disc which is controlled and synchronized by a received TACAN signal to rotate at the same speed as the TACAN antenna pattern. An indicating marking is inscribed on the disc, and the disc is strobed to recurrently illuminate the marking at a particular rate. The strobing of the disc is also controlled by the received TACAN signal, and it has a timing which is a function of the bearing of the aircraft which respect to the TACAN beacon.

Other objects and advantages of the invention will become apparent from a consideration of the following description, when the description is taken in conjunction with the accompanying drawing, in which the single figure schematically represents one embodiment of the invention.

Certain of the components in the accompanying drawing are represented in block form. It will be appreciated that the individual components shown in block form are, in themselves, well known to the art, and that these components may incorporate any appropriate known circuits. It is believed that a detailed circuit explanation of these known components is unnecessary for an understanding of the present invention.

It is also pointed out that the invention is not concerned with the particular circuits utilized in any of the individual components, shown in block form in the drawing.

The embodiment of the invention shown in the drawing includes a TACAN receiver 10 having an associated antenna 12. The antenna 12 intercepts the TACAN signal received from the usual TACAN beacon, and it feeds the signal to the TACAN receiver. The TACAN receiver receives and demodulates the TACAN signal, and it produces a composite output signal which is usually referred to in the art as the TACAN video signal. The TACAN video signal produced by the receiver includes all the components referred to above. These components include the 15 c.p.s. north signal pulses, the 15 c.p.s. major lobe modulations, the 135 c.p.s. minor lobe modulations, and reference auxiliary pulses.

The TACAN video signal from the receiver 10 is passed through an emitter follower transistor stage 14. The emitter follower 14 is coupled to a 15 cycle burst detector 16 which separates and recovers the 15 c.p.s. north signal pulse bursts. The resulting detected "north" signal pulses are amplified in an amplifier 18, and are used intermittently to energize a lamp 20. The lamp 20 may, for example, be a neon lamp of the type presently designated NE2–H.

The TACAN video output signal from the emitter follower 14 is also applied to a peak riding detector 22. The peak riding detector 22 recovers the 15 c.p.s. major lobe modulations and the 135 cycle minor lobe modulation from the received TACAN signal. The signal from the peak riding detector 22 is applied to a gate generator 24. The gate generator 24 responds to the 15 c.p.s. major lobe modulation to produce 15 c.p.s. gate pulses. These pulses are applied to "and" gate 26.

The signal from the peak riding detector 22 is also applied to a filter network 28 which passes the 135 c.p.s. minor lobe modulation components to an amplifier 30. The filter 28 produces a 135 cycle sine wave which is in phase with the minor lobe modulation components.

The amplifier 30 is of the overdriven-clipper type, and it converts the sine wave from the filter 28 into a signal having an essentially square wave configuration. The square wave signal is applied to a clipper and differentiator 32. The clipper and differentiator 32 produces a series of pulses corresponding in phase, for example, to the positive peaks of the square wave signal from the amplifier 30. The pulses from the clipper and differentiator 32 are shifted in phase by 20°, for example, in a phase shifter 34. The resulting pulses from the phase shifter 34 are applied to the gate 26. The output from the gate 26 is applied to a lamp 36 to energize the lamp intermittently. The lamp 36 may also be a neon lamp of the type NE2–H.

The receiving system of the illustrated embodiment of the invention includes a disc 40 which is rotatably mounted in any appropriate manner and which is driven by a synchronous motor 42. The disc 40 has a notch 44 therein which is disposed in the optical path of the lamp 20.

The disc 40 may be formed of a transparent polystyrene plastic, for example, with an opaque coating on its outer surface. The lamp 36 is positioned to edge light the disc 40. A marking, such as an arrow 46 is inscribed on the opaque surface of the disc to extend in a radial direction, as shown. The arrow is illuminated by the lamp 36, so that each time the lamp 36 is energized, the arrow is illuminated.

A pair of photo-electric transducers are disposed in the optical path of the lamp 20 on the opposite side of the notch 44. These photo-electric transducers are designated 50 and 52, and they may, for example, be in the form of solar cells. The transducers 50 and 52 are coupled to a frequency control unit circuit 54 which, in turn, is connected to a 400 cycle phase-shift oscillator 56. The phase-shift oscillator 56 controls the energizing of the synchronous motor 42.

The arrangement of the photo-electric transducers 50 and 52 and their associated circuit is such that the illumination of one of the transducers causes the motor 42 to speed up, and the illumination of the other causes the motor to slow down. This is achieved by the frequency control circuit 54 which is connected to the transducers 50 and 52 and to the phase-shift oscillator 56 in such a manner that the illumination of one of the transducers causes the frequency of the oscillator 56 to increase, and the illumination of the other transducer causes the frequency to decrease.

The 400 cycle synchronous motor 42 is initially controlled, for example, to rotate at a speed about 2% less than 400 cycles. This causes the photo-electric transducer 50 to be energized intermittently by the lamp 20, and the motor 42 is caused to speed up to the synchronous speed. If the disc rotates faster than the synchronous speed, the photo-electric transducer 52 is illuminated by the lamp 20 to cause it to slow down. Therefore, the transducers 50 and 52, and their associated circuit function as a servo loop to lock the rotating disc with the illumination of the lamp 20.

As mentioned above, the lamp 20 is recurrently illuminated by the detected north signal bursts at a 15 c.p.s. rate. This corresponds with the 900 r.p.m. rotational synchronous speed of the disc 40. The notch 44 of the disc 40, therefore, lines up with the lamp 20 each time it is illuminated, so long as synchronization is maintained, so that equal illumination falls on both the transducers 50 and 52, thereby maintaining the rotating disc 40 locked with the received north signal bursts.

Of course, other suitable synchronizing schemes may be used, the net result being to cause the disc 40 to rotate at the same speed as the rotating antenna pattern of the TACAN beacon, and in synchronism with the north signal bursts of the received TACAN signal.

The 15 c.p.s. major lobe modulation of the received TACAN signal is used to control the conductivity of the gate 26, and this is achieved by causing the gate generator 24 to apply the 15 c.p.s. pulses to the gate in response to the major lobe components. The minor lobe modulation components of the received TACAN signal are used to produce pulses at the output of the clipper and differentiator stage 32. These latter pulses are relatively narrow compared to the 15 c.p.s. pulses. There is some phase shift normally present in the circuit, and these relatively narrow pulses are phase shifted by the phase shifter 34 by whatever additional shift is required so that they will appear in the center of the corresponding relatively broad 40° gate pulses from the major lobe gate signal generator 24, instead of to one side of the gate pulses. This phase shifted relationship of the 135 c.p.s. minor lobe narrow pulses from the phase shifter 34 permits a slight variation in the timing between the narrow minor lobe pulses and the relatively broad major lobe gate pulses from the generator 24 without corresponding ones of the minor lobe pulses being lost. Each time a minor lobe pulse from the phase shifter 34 is passed through the gate 26, the lamp 36 is illuminated, which illuminates the arrow 46 on the disc 40.

The lamp 20 is illuminated, therefore, each time a 15 c.p.s. north burst is received from the beacon, so that the lamp 20 is recurrently illuminated at 15 c.p.s. As mentioned above, the rotation of the disc 40 is controlled to proceed at the 900 r.p.m. rate, so that the disc may be synchronized by the 15 c.p.s. illumination rate of the lamp 20.

The lamp 36 is also illuminated at the 15 c.p.s. rate (at the crossover point) by the gating of the 135 c.p.s. minor lobe pulses by the 15 c.p.s. major lobe pulses in the gate 26. The broad 15 c.p.s. major lobe pulses occur with a phase displacement with respect to the north signal burst components of the received TACAN signal which corresponds to the azimuth of the aircraft in which the system is installed.

The arrow 46 is strobed, therefore, at a time which represents the azimuth of the vehicle, and the azimuth can be read directly from the angular position of arrow 46. Moreover, the relatively fine 135 c.p.s. pulses recovered from the minor lobe modulation components of the received TACAN signal cause the arrow 46 to be recurrently illuminated at a precise time within the respective intervals of the gate pulses from the generator 24. This enables the indication from the simplified navigation system of the present invention to be achieved with all the accuracy of the more expensive prior art systems.

The invention provides, therefore, an improved and simplified TACAN receiving system, which is capable of responding to signals received from a usual TACAN beacon and of providing an instantaneous and readily observable indication of the bearing and/or azimuth of the aircraft in which the system is installed.

While a particular embodiment of the invention has been described, modifications may be made, and it is intended in the claims to cover such modifications as fall within the spirit and scope of the invention.

I claim:

1. A receiver for use in a vehicle for receiving a signal from a beacon source, the received signal having a plurality of modulation components whose phase relationship indicates the bearing of the vehicle with respect to the beacon source, said receiver including:

(a) a movable member having an indicating marking,
   (b) drive means coupled to said movable member for driving said movable member at a predetermined rate,
   (c) circuit means coupled to said drive means for synchronizing said drive means with one of the modulation components of the received signal,
   (d) means optically coupled to said movable member for illuminating said marking, and
   (e) a strobing circuit coupled to said illuminating means for recurrently energizing said illuminating means at a predetermined rate in response to further modulation components of the received signal and with a timing determined by the aforementioned phase relationship between the modulation components of the received signal, said strobing circuit including circuits for producing first and second series of pulses in response to said further components of said received signal, and in which said strobing circuit further includes a gate circuit responsive to pulses of said first series for passing selected pulses of said second series to said illuminating means recurrently to energize said illuminating means.

2. A receiver for use in a vehicle for receiving a signal from a beacon source, the received signal having a plurality of modulation components whose phase relationship indicates the bearing of the vehicle with respect to the beacon source, said receiver including:
 (a) a rotatable disc member having an indicating marking inscribed thereon,
 (b) a synchronous motor mechanically coupled to said disc for rotatably driving said disc at a predetermined speed,
 (c) circuit means coupled to said synchronous motor for synchronizing said motor with one of the modulation components of the received signal,
 (d) means optically coupled to said disc for illuminating said marking thereon, and
 (e) a strobing circuit coupled to said illuminating means for recurrently energizing said illuminating means at a predetermined rate in response to further modulation components of the received signal and with a timing determined by the aforementioned phase relationship between the modulation components of the received signal, said strobing circuit including circuits for producing first and second series of pulses in response to said further components of said received signal, and said strobing circuit further including a gate circuit responsive to pulses of said first series for passing selected pulses of said second series to said illuminating means recurrently to energize said illuminating means.

3. Apparatus as defined in claim 2 in which said circircuit means coupled to said synchronous motor includes light means, and light-responsive means cooperating therewith, said light means being able to shine through said disc only when it is in a predetermined position.

4. Apparatus as defined in claim 3 in which said light-responsive means is coupled to a frequency control circuit for increasing the speed of said motor when said disc rotates slower than said light means is flashing, and for decreasing the speed of said motor when said disc rotates faster than said light means is flashing, said light means flashing only when said one of the modulation components of said received signal is supplied thereto.

5. Apparatus as defined in claim 2 in which said indicating marking is inscribed upon an opaque surface of said disc so that said marking is illuminated only by light shining upon the edge surface of said disc, and in which said means optically coupled to said disc is a light means positioned so as to be able to shine upon said edge surface.

6. A receiver for use in a vehicle for receiving a signal from a beacon source, the received signal having a plurality of modulation components whose phase relationship indicates the bearing of the vehicle with respect to the beacon source, said receiver including:
 (a) a rotatable disc member having an opaque surface and an indicating marking inscribed thereon, so that said marking is illuminated only by light shining upon the edge surface of said disc,
 (b) a synchronous motor mechanically coupled to said disc for rotatably driving said disc at a predetermined speed,
 (c) circuit means coupled to said synchronous motor for synchronizing said motor with one of the modulation components of the received signal, said circuit means including first light means, and light-responsive means cooperating therewith, said first light means being able to shine through said disc only when said disc is in a predetermined position, and said light-responsive means being coupled to a frequency control circuit for increasing the speed of said motor when said disc rotates slower than said first light means is flashing, and for decreasing the speed of said motor when said disc rotates faster than said first light means is flashing, said first light means flashing only when said one of the modulation components of said received signal is supplied thereto,
 (d) second light means optically coupled to said disc for illuminating said marking thereon, said second light means being positioned so as to be able to shine upon said edge surface, and
 (e) a strobing circuit coupled to said second light means for recurrently energizing said second light means at a predetermined rate in response to further modulation components of the received signal and with a timing determined by the aforementioned phase relationship between the modulation components of the received signal, said strobing circuit including circuits for producing first and second series of pulses in response to said further components of said received signal, and said strobing circuit further including a gate circuit responsive to pulses of said first series for passing selected pulses of said second series to said second light means recurrently to energize said second light means.

References Cited by the Examiner
UNITED STATES PATENTS

| | | | |
|---|---|---|---|
| 2,232,096 | 2/41 | Dane | 343—118 |
| 2,468,109 | 4/49 | Richardson et al. | 343—118 |
| 2,519,331 | 8/50 | Gordon | 324—83 X |
| 2,559,663 | 7/51 | Richardson | 343—118 X |
| 3,115,632 | 12/63 | Peach et al. | 343—106 |

CHESTER L. JUSTUS, *Primary Examiner.*